United States Patent Office 3,484,388
Patented Dec. 16, 1969

3,484,388
ALKENE OXIDE POLYMERIZATION WITH AN ORGANOALUMINUM, BETA-DIKETONE METAL SALT AND ADJUVANT CATALYST SYSTEM
Clinton F. Wofford, Bartlesville, Okla., assignor to Phillips Petroleum Company, a corporation of Delaware
No Drawing. Filed June 7, 1965, Ser. No. 462,114
Int. Cl. C08g 23/14, 23/06; B01j 11/00
U.S. Cl. 260—2          13 Claims

ABSTRACT OF THE DISCLOSURE

Vicinal alkene oxides are polymerized in the presence of a catalyst comprising an organoaluminum compound and a metal salt of a beta-diketone and a catalyst adjuvant selected from the group consisting of N,N,N',N'-tetraalkylbenzidines; N,N,N',N'-tetraalkylureas; N,N,N',N'',N''-hexaalkylphosphoric triamides; tris-N,N - dialkylaminomethylphosphines; and tetrahydrothiophene 1,1-dioxides.

This invention relates to alkene oxide polymerization. In one aspect, this invention relates to catalyst systems for polymerizing epoxides. In another aspect, this invention relates to processes of polymerizing alkene oxides.

Conventional processes of the prior art for polymerizing alkene oxides involve the use of a catalyst such as an organoaluminum compound or an organoaluminum compound in admixture with a particular type metal acetylacetonate. The alkene oxide polymers produced by these catalysts range in consistency from low molecular weight liquids to relatively high molecular weight waxy solids. An inherent disadvantage with the catalysts of the prior art for polymerizing alkene oxides is that many of the resulting polymers have no elastomeric properties. Although some of the prior art catalysts produce polymers having elastomeric properties, in some cases the molecular weight of these rubbery polymers is too low for certain types of applications. In view of these deficiencies in the polymer product, the catalysts of the prior art have not received widespread commercial acceptance for polymerizing alkene oxides.

According to this invention, these and other disadvantages of the prior art processes of polymerizing alkene oxides are overcome by providing a novel catalyst system and process which results in the production of high molecular weight alkene oxide polymers having elastomeric properties. The high molecular weight rubbery alkene oxide polymers are produced in the practice of this invention by employing an adjuvant during the polymerization reaction. The catalyst which can be used for effecting polymerization of the alkene oxides comprises an organoaluminum compound and a metal salt of a beta-diketone. The adjuvant is a material selected from the group consisting of N,N,N',N' - tetraalkylbenzidines; N,N,N',N'-tetraalkylureas; N,N,N',N',N'',N'' - hexaalkylphosphoric triamides; tris-N,N - dialkylaminomethylphosphines; and tetrahydrothiophene 1,1-dioxides. By using an adjuvant selected from the previously identified group in accordance with this invention, the alkene oxide polymer produced is a high molecular weight rubbery product.

Accordingly, it is an object of this invention to provide high molecular weight alkene oxide polymers.

Another object of this invention is to provide a process of producing high molecular weight rubbery alkene oxide polymers.

A further object of this invention is to provide an adjuvant which can be used to provide high molecular weight alkene oxide polymers.

Still another object of this invention is to provide an improved process of polymerizing alkene oxides.

A still further object of this invention is to provide a process of producing alkene oxide polymers which are flexible at low temperatures, and which are highly resistant to the effects of high temperatures and to the effects of ozone.

Yet another object of this invention is to provide a process of polymerizing alkene oxides which will result in the formation of a product which is sulfur vulcanizable.

These and other objects of the invention will become apparent to one skilled in the art after studying the following detailed description and the appended claims.

The adjuvant of this invention can be used for increasing the molecular weight of any alkene oxide polymer. Exemplary alkene oxides which can be polymerized by the process of this invention are those containing up to and including 20 carbon atoms per molecule. It is preferred to employ this invention when polymerizing alkene oxide monomers containing from about 2 to about 8 carbon atoms. Thus, alkene oxides which can be polymerized by the process of this invention can be represented by the formula

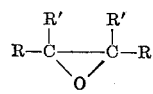

wherein R and R' are selected from the group consisting of hydrogen, saturated aliphatic, saturated cycloaliphatic, monoolefinic aliphatic, diolefinic aliphatic (conjugated and non-conjugated), monoolefinic cycloaliphatic, diolefinic cycloaliphatic (conjugated and non-conjugated), and aromatic radicals and combinations of these such as aralkyl, alkaryl, and the like. Some or all of the R and R' radicals can be halogen-substituted, and can contain oxygen in the form of an acyclic ether linkage (—O—) or an oxirane group

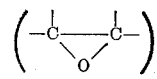

Further, the alkene oxides represented by the above formula can contain 1 or 2 olefinic linkages, 1 or 2 oxirane groups, and up to 1 ether linkage. In addition, both R' variables can represent a divalent aliphatic hydrocarbon radical which, together with the carbon atoms of the oxirane group, can form a cycloaliphatic hydrocarbon nucleus containing from about 4 to about 10 carbon atoms and preferably from about 4 to about 8 carbon atoms.

Specific examples of some of the alkene oxides which are within the above structural formula and which can be homopolymerized or copolymerized in accordance with this invention are ethylene oxide (epoxyethane); 1,2-epoxypropane (propylene oxide); 1,2-epoxybutane; 2,3-epoxybutane; 1,2-epoxypentane; 2,3-epoxypentane; 1,2-epoxyhexane; 3,4-epoxyhexane; 1,2 - epoxyheptane; 2,3-epoxyoctane; 2,3-dimethyl-2,3-epoxypentane; 1,2-epoxy-4-methylpentane; 2,3-epoxy-5-methylhexane; 1,2-epoxy-4,4-dimethylpentane; 4,5 - epoxyeicosane; 1 - chloro - 2,3-epoxypropane (epichlorohydrin); 1-bromo - 2,3 - epoxypropane; 1,5 - dichloro - 2,3 - epoxypentane; 2 - iodo - 3,4-epoxybutane; styrene oxide; 6-oxabicyclo[3.1.0]-hexane; 7-oxabicyclo[4.1.0]heptane; 3-propyl - 7 - oxabicyclo-[4.1.0]heptane; bis(2,3-epoxybutyl)ether; tert - butyl 4,5-epoxyhexyl ether; and 2-phenylethyl 3,4-epoxybutyl ether.

Unsaturated alkene oxides within the above structural formula, including ethers, which can be homopolymerized or copolymerized with the saturated alkene oxides include allyl 2,3-epoxypropyl ether (allyl glycidyl ether); allyl 3,4-epoxybutyl ether; 1-methallyl 3,4-epoxyhexyl ether; 3-hexenyl 5,6-epoxyhexyl ether; 2,6-octadienyl 2,3,7,8- diepoxyoctyl ether; 6-phenyl-3-hexenyl 3-ethyl-5,6-epoxyhexyl ether; 3,4-epoxy-1-butene (butadiene monoxide); 3,4-epoxy-1-pentene; 5 - phenyl-3,4 - epoxy-1 - pentene; 1,2,9,10-diepoxy-5-decene; 6,7-di-n-butyl-3,4,9,10-diepoxy-1,11-dodecadiene; epoxy vinyl ether; allyl 2-methyl-2,3-epoxy-propyl ether; 3-cyclohexyl-2-propenyl 4-cyclohexyl-3,4-epoxybutyl ether; 2,4 - pentadienyl 2,3 - diethyl-3,4-epoxybutyl ether; 1-methallyl 6 - phenyl-3,4 - epoxyhexyl ether; 5-(4-tolyl)2,3-epoxypentyl vinyl ether; bis[4 - (3-cyclopentyl)2,3 - epoxybutyl] ether; 2-(2,4 - cyclohexadienyl)ethyl 2,3-epoxybutyl ether; 2-(2,5-cyclohexadienyl) ethyl 2-benzyl-4,5-epoxypentyl ether; 3,4-epoxy-1,5-hexadienyl isopropyl ether; allyl 3,4-dimethyl-3,4-epoxyhexyl ether; 3,4-epoxy-4-(2,3-dimethylphenyl) 1-butene; 3,4-dimethyl-3,4-epoxy-1-pentene; 5-(4-methylcyclohexyl)-3,4-epoxy-1-pentene; 4,5-diethyl-4,5-epoxy-2,6 - octadiene; 4-(2,4 - cyclopentadienyl) - 1,2,6,7 - diepoxyheptane; and 1-phenyl-1,2-epoxy-5,7-octadiene.

The catalyst which can be used to effect polymerization of the alkene oxides comprises an organoaluminum compound and a metal salt of a beta-diketone. The organoaluminum compound of the catalyst can be represented by the formula R″$_n$AlX$_m$ wherein R″ is a hydrocarbon radical selected from the group consisting of saturated aliphatic, saturated cycloaliphatic, and aromatic containing from 1 to 20 carbon atoms, inclusive, and combinations such as aralkyl, alkaryl, and the like; X is a member of the class consisting of hydrogen, fluorine, chlorine, bromine and iodine; $n$ is an integer of from 1 to 3, inclusive; $m$ is an integer of from 0 to 2, inclusive; and the sum of the integers $n$ and $m$ equals 3. Organoaluminum compounds within the above formula include triorganoaluminum compounds, organoaluminum monohalides, organoaluminum monohydrides, organoaluminum dihalides, organoaluminum dihydrides, and organoaluminum sesquihalides. The organoaluminum sesquihalides as herein defined are intended to mean a mixture of organoaluminum monohalides and organoaluminum dihalides of the formulas R″$_2$AlX and R″AlX$_2$, respectively, wherein R″ is the same as hereinbefore defined with respect to the general formula and X is a halogen. The organoaluminum sesquihalides can then be written as $$R''_3Al_2X_3 \text{ or as } R_{1\,1/2}AlX_{1\,1/2}$$

Exemplary organoaluminum compounds within the above formula include trimethylaluminum, triethylaluminum, tri-n-butylaluminum, triisobutylaluminum, tri - n - hexylaluminum, tri-n-decylaluminum, tri-n-eicosylaluminum, tricyclohexylaluminum, triphenylaluminum, methyldiphenylaluminum, ethylbis(3,5 - diheptylphenyl)aluminum, tribenzylaluminum, tri - 1 - naphthylaluminum, di-n-octylphenylaluminum, tri - 4 - tolylaluminum, dimethylchloroaluminum, methyldichloroaluminum, n - heptyldifluoroaluminum, 3-ethylcyclopentyl-diiodaluminum, methylisobutylchloroaluminum, diphenylbromoaluminum, dibenzylchloroaluminum, di - n - octylchloroaluminum, n - octylphenylchloroaluminum, di - n - eicosyliodoaluminum, n-butyldihydroaluminum, methyldihydroaluminum, diisopropylhydroaluminum, ethylmethylhydroaluminum, diphenylhydroaluminum, benzyl-n-dodecylhydroaluminum, dicyclohexylhydroaluminum, 2,6-di-n-butyl-4 - hexylphenyldihydroaluminum, and n-amylethylhydroaluminum.

The metal salt of the beta-diketone compound of the catalyst can be represented by the formula

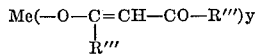

wherein Me is a metal selected from Groups II–A, III–A, IV–A, I–B, II–B, IV–B, V–B, VI–B, VII–B and VIII of the Periodic Table of the Elements in the "Handbook of Chemistry and Physics," 45th edition, page B–2. The Chemical Rubber Company (1964); each R‴ is a radical selected from the group consisting of saturated aliphatic, saturated cycloaliphatic, and aromatic containing from 1 to 10 carbon atoms, inclusive, and combinations thereof such as alkaryl, aralkyl, and the like; and $y$ is an integer equal to the valence of the metal Me. The general formula for metal salts of beta-diketones is expressed structurally in Moeller, "Inorganic Chemistry," page 241, Wiley and Sons (1952). Preferred metals within the above groups which can be combined with a beta-diketone to form the corresponding metal salt include beryllium, magnesium, calcium, strontium, barium, boron, aluminum, gallium, indium, thallium, silicon, germanium, tin, lead, copper, silver, zinc, cadmium, mercury, titanium, zirconium, vanadium, chromium, molybdenum, tungsten, manganese, iron, cobalt and nickel.

Specific beta-diketones which can be combined with a metal from the above groups to form the corresponding metal salt include 2,4-pentanedione (acetylacetone); 3,5-heptanedione; 11,13-tricosanedione; 1,3-dicyclohexyl-1,3-propanedione; 1,5-dicyclopentyl-2,4-pentanedione; 1,3-diphenyl-1,3-propanedione; 1,5-diphenyl-2,4-pentanedione; 2,8-dimethyl-4,6-nonanedione; 1,3-di(4-n - butylphenyl)-1,3-propanedione; 1,11-diphenyl-5,7 - hendecanedione; 1-phenyl-1,3-butanedione; 2,4 - decanedione; and 1(3,5 - dimethylcyclohexyl)2,4-pentanedione.

The adjuvants which increase the molecular weight of the rubbery polymers produced in accordance with this invention are selected from the group consisting of N,N,N′,N′-tetraalkylbenzidines of the formula

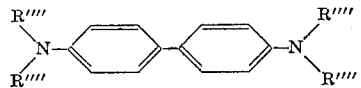

N,N,N′,N′-tetraalkylureas of the formula

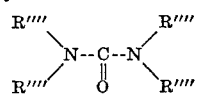

N,N,N′,N′,N″,N″-hexaalkylphosphoric triamides of the formula

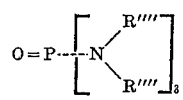

tris-N,N-dialkylaminomethylphosphines of the formula

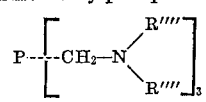

and tetrahydrothiophene 1,1-dioxides of the formula

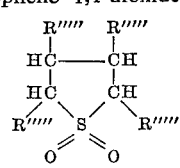

wherein each R‴″ is an alkyl radical containing from 1 to 12 carbon atoms, inclusive; where each R‴‴ is a member of the class consisting of hydrogen and alkyl radicals containing from 1 to 12 carbon atoms, inclusive; and wherein the total number of carbon atoms in all of the R‴‴ alkyl radicals does not exceed 12.

Specific adjuvants within the scope of the above N,N,N′,N′ - tetraalkylbenzidine formula include N,N,N′,N′-tetramethylbenzidine, N,N,N′,N′-tetraethylbenzidine; N,N,N′,N′-tetraisopropylbenzidine; N,N′-dimethyl-N,N′-di-n-propylbenzidine; N,N,N′,N′ - tetra-tert-butylbenzidine; N - methyl - N,N′-di-n-amyl-N′-dodecylbenzidine; N,N-dimethyl-N′,N′-di-n-hexylbenzidine; N,N′-di-n-amyl-N,N′-di-n - decylbenzidine; N,N,N′,N′-tetra-n-dodecylbenzidine; N,N,N′,N′ - tetra - 2,3,4-triethylhexylbenzidine; and N,N,N′-tri-n-octyl-N′-6-n-propylnonylbenzidine.

Specific N,N,N′,N′-tetraalkylurea compounds within the purview of the above formula include 1,1,3,3-tetramethylurea; 1,1,3,3-tetraethylurea; 1,1,3,3-tetra-n-amylurea; 1,1,3,3-tetra-n-heptylurea; 1,1,3,3-tetra-n-hendecylurea; 1,1,3,3-tetra-n-dodecylurea; 1,1-diisopropyl-3,3-di-n-hexylurea; 1,1,3,3-tetra-(3-n-propylhexyl)urea; 1-methyl-1,3,3-tri-tert - butylurea; 1,1,3,3-tetra(2,4,6 - trimethylheptyl)urea; 1,1,3,3 - tetra(1,3,5,7-tetramethyloctyl)urea; and 1,1-diethyl-3-n-butyl-3(1,1,3-triethylhexyl)urea.

Specific N,N,N',N',N'',N''-hexaalkylphosphoric triamide compounds within the purview of the above formula include hexamethylphosphoric triamide; hexa-n-butylphosphoric triamide; hexa-n-octylphosphoric triamide; hexa-n-dodecylphosphoric triamide; N,N,N',N'-tetraethyl-N'',N''-di-n-heptylphosphoric triamide; N,N-diisopropyl-N',N'-di-n-amyl-N'',N''-di - n-nonylphosphoric triamide; N,N',N''-tri-tert-butyl-N,N',N''-tri-n-decylphosphoric triamide; and N,N',N''-trimethyl-N,N',N''-tri(4-n-butyloctyl)phosphoric triamide.

Specific tris-N,N-dialkylaminomethylphosphine compounds within the purview of the above formula include tris(N,N - dimethylaminomethyl)phosphine; tris(N,N-diethylaminoethyl)phosphine; tris(N,N - di-n-hexylaminomethyl)phosphine; tris(N,N-di - n-dodecylaminomethyl) phosphine; tris(N-methyl-N-isopropylaminomethyl)phosphine; tris(N,N-3-n - butylhexylaminomethyl)phosphine; N,N-diethylaminomethyl - bis(N-n - amyl - N-n-dodecylaminomethyl)phosphine; and N,N-diisopropylaminomethyl-bis(N,N-di-n-hendecylaminomethyl)phosphine.

Exemplary tetrahydrothiophene 1,1-dioxide compounds within the purview of the above formula include tetrahydrothiophene 1,1-dioxide; 2-methyltetrahydrothiophene 1,1-dioxide; 2,3-dimethyltetrahydrothiophene 1,1-dioxide; 2,3,4,5-tetramethyltetrahydrothiophene 1,1 - dioxide; 3-ethyltetrahydrothiophene 1,1-dioxide; 3,5-diethyltetrahydrophene 1,1-dioxide; 2-methyl-4-tert-butyltetrahydrothiophene 1,1-dioxide; 2,3-di-n-heptyltetrahydrothiophene, 1,1-dioxide; 3,4-di-n-dodecyltetrahydrothiophene 1,1-dioxide; 2,5-dimethyl-3,4-didecyltetrahydrothiophene 1,1-dioxide; 3-n-propyl-4(3,3 - dimethylbutyl)tetrahydrothiophene 1,1-dioxide; and 3(3,3-diethylamyl)tetrahydrothiophene 1,1-dioxide. The tetra hydrothiophene 1,1-dioxides of this invention are intended to mean substituted tetrahydrothiophene 1,1-dioxide wherein the R''''' is a member of the class consisting of hydrogen and alkyl radicals containing from 1 to 12 carbon atoms as hereinbefore defined.

The alkene oxide polymerization reaction can be conducted either as a batch process or as continuous process with the catalyst being added as a single initial charge or in predetermined increments during polymerization. Similarly, the adjuvant which increases the molecular weight of the polymer can be added in a single increment at the beginning of the reaction or it can be added in predetermined increments during the polymerization. Moreover, the organoaluminum compound of the catalyst can be admixed with the metal salt of the beta-diketone of the catalyst prior to contacting the alkene oxide monomers or the two compounds can be added separately to a reaction vessel containing the alkene oxide monomers.

In order to expedite and improve the efficiency of the reaction, it is generally preferred that it be conducted in the presence of an inert diluent. Suitable diluents which can be used for this purpose include paraffinic, cycloparaffinic and aromatic hydrocarbons containing from about 4 to about 10 carbon atoms per molecule. Exemplary diluents which can be used separately or in admixture with each other are butane, pentane, hexane, decane, cyclopentane, cyclohexane, methylcyclohexane, benzene, toluene, xylene, ethylbenzene, and the like. It is also within the spirit and scope of this invention to employ halogenated hydrocarbons such as chlorobenzene and the like as diluents. Since the actual diluent forms no part of the invention, it is possible to employ other diluents than those hereinbefore identified without departing from the invention.

The catalyst level in the polymerization reaction is ordinarily maintained on the basis of the organoaluminum compound present. Generally, the organoaluminum compound is present in an amount within the range of from about 1 to about 100 gram millimoles per 100 grams of monomer and preferably within the range of from about 5 to about 40 gram millimoles per 100 grams of monomer.

The metal salt of the beta-diketone in the catalyst is based on the quantity of organoaluminum compound employed. Normally, the metal salt of the beta-diketone is present in an amount within the mole ratio range of organoaluminum compound to metal salt of from about 2:1 to about 100:1 and preferably within the mole ratio range of from about 5:1 to about 30:1.

The quantity of adjuvant employed for increasing the molecular weight of the polymer is based on the amount of monomers being polymerized. Generally, the adjuvant is present in an amount within the range of from about 0.005 to about 5 parts by weight per 100 parts by weight alkene oxide and preferably within the range of from about 0.01 to about 2 parts by weight per 100 parts by weight alkene oxide.

The temperature and pressure at which the polymerization process of this invention is effected can vary over a rather wide range. Generally, polymerization can be conducted at a temperature within the range of from about 40 to about 250° F. and preferably within the range of from about 85 to about 200° F. Polymerization is usually conducted at a pressure which will maintain the materials in the liquid state. It is obvious that the reaction can be conducted at superatmospheric pressures of several thousand pounds or more, if desired.

The duration of the polymerization reaction will depend primarily upon temperature, pressure, and the activity of the particular catalyst being used. Usually, the process will be conducted for a period of from about a few minutes or less to about 100 hours or more. A preferred range is from 10 minutes to about 50 hours.

The adjuvant of this invention results in the formation of higher molecular weight alkene oxide polymers than are obtained without the adjuvant thus expanding the utility of the final product. The polymers produced with the catalyst system and the adjuvant of this invention exhibit extremely good low temperature flexibility. Further, the rubbery polymers produced in accordance with this invention are particularly resistant to the effects of heat and to the effects of ozone. These polymers have unlimited utility in the automobile industry for fabricating articles such as motor mounts, body mounts, suspension system parts, hoses, tubing, and the like.

The following examples will serve to illustrate a process which can be used to produce the high molecular weight rubbery polymers in accordance with this invention. It is to be understood that such examples are for the purpose of illustration only, and that many variations and modifications can be made from the various examples by one skilled in the art without departing from the concept of this invention.

EXAMPLES I–VIII

A series of runs was conducted whereby 1,2-epoxypropane was polymerized with a catalyst comprising triisobutylaluminum and the magnesium salt of 2,4-pentanedione. Variable amounts of different adjuvants of this invention were employed to illustrate the improvement obtained thereby. Several comparative or control runs were made under identical conditions without an adjuvant and the results were averaged. This average can be compared with the results of the runs using the adjuvant to illustrate the improvement obtained thereby. The materials were charged to a reactor in the following proportions:

1,2-epoxypropane, parts by weight _____ 100
Cyclohexane, parts by weight _____ 780
Triisobutylaluminum, mhm [1] _____ 30
Magnesium salt of 2,4-pentanedione·H₂O, mhm [1] __ 5
Adjuvant, parts by weight _____ variable
Temperature, °F. _____ 122
Time, hours _____ 24

[1] Mhm=gram millimoles per 100 grams epoxypropane.

The polymerization technique employed involved the steps of charging the reactor with cyclohexane and thereafter purging it with nitrogen. The 1,2-epoxypropane was then added followed by the adjuvant, the latter being dispersed in a solution of toluene in an amount of about 1 weight percent. A mixture of triisobutylaluminum and magnesium salt of 2,4-pentanedione was then charged to the reactor. At the conclusion of each run approximately 2 parts by weight of 2,2'-methylene-bis-(4-methyl-6-tert-butylphenol) antioxidant was added per 100 weight parts of 1,2-epoxypropane charged to the reactor. The reaction mixture was then poured into water which had been previously acidified with hydrochloric acid. The mixture then stratified into an aqueous phase and an organic phase. The aqueous phase was separated and the organic phase was washed with water to remove catalyst residues. The polymer was recovered from the organic phase by evaporating the diluent and drying the product under vacuum. At the conclusion of each run, the reactor was rinsed with acetone to remove any polymer solution that remained. All of the polymers thus produced possessed elastomeric properties. The improved results obtained with the adjuvant of this invention are reported in Table I below.

TABLE I

| Example No. | Adjuvant Type | phm [1] | Monomer conversion (percent) | Inherent viscosity |
|---|---|---|---|---|
| Control [2] | | | 45 | 5.65 |
| 1 | Hexamethylphosphoric triamide | 0.01 | 45 | 6.49 |
| 2 | do | 0.5 | 42 | 7.82 |
| 3 | Tetramethylurea | 0.05 | 46 | 6.62 |
| 4 | do | 0.5 | 45 | 6.81 |
| 5 | Tetrahydrothiophene 1,1-dioxide | 0.10 | 45 | 6.71 |
| 6 | N,N,N',N'-tetramethylbenzidine | 0.10 | 44 | 6.26 |
| 7 | do | 0.5 | 63 | 8.88 |
| 8 | Tris(dimethylaminomethyl)phosphine | 0.5 | 45 | 7.32 |

[1] phm=parts by weight per 100 parts by weight monomer.
[2] The results of the control represents an average of four different runs conducted under the same conditions and with the same technique as in the examples.

In order to determine the inherent viscosity, one-tenth gram of polymer was placed in a wire cage made from 80-mesh screen and the cage was placed in 100 ml. of toluene contained in a wide-mouth, 4-ounce bottle. After standing at room temperature (approximately 77° F.) for about 24 hours, the cage was removed and the solution filtered through a sulfur absorption tube of Grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

It can be seen by comparing the control with the several examples reported in Table I that the adjuvants of this invention increase the inherent viscosity and hence the molecular weight of the polymers because inherent viscosity is an indication of molecular weight. It should also be noted that the percent monomer conversion increased in Example VII.

Two additional runs were conducted whereby 1,2-epoxypropane was polymerized by means of a catalyst comprising triisobutylaluminum and magnesium salt of 2,4-pentanedione using hexamethylphosphoric triamide as an adjuvant in one run and N,N,N',N'-tetramethylbenzidene as an adjuvant in the other run. The runs were made at a temperature of 158° F. for a period of 7 hours. A high molecular weight rubber polymer was produced, thus illustrating the operability of the invention at different temperatures.

As hereinbefore indicated, any alkene oxide can be homopolymerized or copolymerized to form a rubbery polymer by means of the catalyst of this invention. When one or more of the alkene oxide monomers is unsaturated, the rubbery polymer product can be sulfur vulcanized. This invention is particularly applicable in the copolymerization of 1,3-epoxypropane and an unsaturated alkene oxide such as allyl-2,3-epoxypropyl ether (allyl glycidyl ether). The invention is further applicable when a copolymer is formed from two unsaturated alkene oxides such as allyl 2,3-epoxypropyl ether (allyl glycidyl ether) and 3,4-epoxy-1-butene (butadiene monoxide). These copolymers are readily sulfur vulcanizable because the polymer chains contain a multiplicity of olefinic bonds. Polymerization conditions and techniques for copolymerizing two or more alkene oxides are the same as those employed in the homopolymerization of alkene oxides. Thus, factors such as catalyst level, temperature, pressure, and the like, in the homopolymerization reaction can be employed in a like manner in the copolymerization reaction.

Although the invention has been described in considerable detail, it must be understood that such detail is for the purpose of illustration only and that many variations and modifications can be made by one skilled in the art without departing from the spirit and scope of the invention.

I claim:
1. A process of polymerizing alkene oxides of the formula

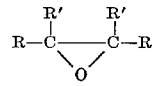

wherein R and R' are selected from the group consisting of hydrogen, saturated aliphatic, saturated cycloaliphatic, monoolefinic aliphatic, diolefinic aliphatic, monoolefinic cycloaliphatic, diolefinic cycloaliphatic, and aromatic radicals, halogen-substituted radicals of the foregoing type, and combinations thereof, and said radicals can contain oxygen in the form of an acyclic ether linkage (—O—) or an oxirane group

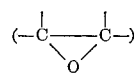

and said alkene oxide can contain 1 or 2 olefinic linkages, 1 or 2 oxirane groups, and 1 ether linkage, and both R' variables in said alkene oxide can represent a divalent aliphatic hydrocarbon radical which together with the oxirane group in said alkene oxide can form a cycloaliphatic nucleus, said process comprising contacting at least one of said alkene oxides with a catalyst consisting essentially of (a) an organoaluminum compound of the formula

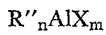

wherein R'' is a hydrocarbon radical selected from the group consisting of saturated aliphatic, saturated cycloaliphatic, and aromatic containing from 1 to 20 carbon atoms, inclusive; X is a member of the class consisting of hydrogen, fluorine, chlorine, bromine, and iodine; n is an integer of from 1 to 3, inclusive; m is an integer of from 0 to 2, inclusive; and the sum of the integers n and m equals 3; and (b) a metal salt of a beta-diketone of the formula

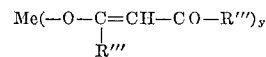

wherein Me is a metal selected from Groups II-A, III-A, IV-A, I-B, II-B, IV-B, V-B, VI-B, VII-B and VIII of the periodic table; each R''' is a radical selected from the group consisting of saturated aliphatic, saturated cycloaliphatic, and aromatic containing from 1 to 10 carbon atoms, inclusive; and y is an integer equal to the valence of the metal Me; said alkene oxide being contacted with said catalyst in the presence of an adjuvant selected from the group consisting of N,N,N',N'-tetraalkylbenzidines of the formula

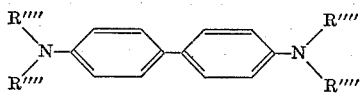

N,N,N',N'-tetraalkylureas of the formula

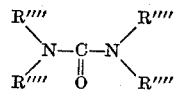

N,N,N',N',N'',N''-hexaalkylphosphorictriamides of the formula

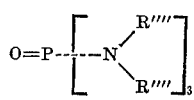

tris-N,N-dialkylaminomethylphosphines of the formula

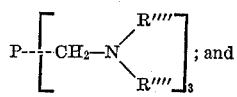; and tetrahydrothiophene 1,1-dioxides of the formula

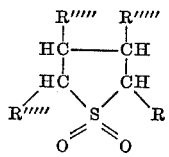

wherein each R'''' is an alkyl radical containing from 1 to 12 carbon atoms, inclusive; wherein each R''''' is a member of the class consisting of hydrogen and alkyl radicals containing from 1 to 12 carbon atoms, inclusive; and wherein the total number of carbon atoms in all of the R''''' alkyl radicals does not exceed 12; wherein said organoaluminum compound is present in an amount within the range of from about 1 to about 100 gram millimoles per 100 grams of monomer; wherein the mole ratio of said organoaluminum compound to said metal salt of a beta-diketone is within the range of from about 2:1 to about 100:1; and wherein said adjuvant is present in an amount within the range of from about 0.005 to about 5 grams per 100 grams of monomer.

2. A process according to claim 1 wherein the polymerization is conducted at a temperature within the range of from about 40 to about 250° F.

3. The process according to claim 2 wherein said adjuvant is hexamethylphosphoric triamide.

4. The process of claim 2 wherein said adjuvant is tetramethylurea.

5. The process of claim 2 wherein said adjuvant is N,N,N',N'-tetramethylbenzidine.

6. The process of claim 2 wherein said adjuvant is tetrahydrothiophene 1,1-dioxide.

7. The process of claim 2 wherein said adjuvant is tris(dimethylaminomethyl)phosphine.

8. A process of polymerizing alkene oxides of the formula

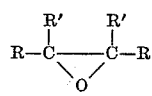

wherein R and R' are selected from the group consisting of hydrogen, saturated aliphatic, saturated cycloaliphatic, monoolefinic aliphatic, diolefinic aliphatic, monoolefinic cycloaliphatic, diolefinic cycloaliphatic, and aromatic radicals, halogen-substituted radicals of the foregoing type, and combinations thereof, and said radicals can contain oxygen in the form of an acrylic ether linkage (—O—) or an oxirane group

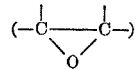

and said alkene oxide can contain 1 or 2 olefinic linkages, 1 or 2 oxirane groups, and 1 ether linkage, and both R' variables in said alkene oxide can represent a divalent aliphatic hydrocarbon radical which together with the oxirane group in said alkene oxide can form a cycloaliphatic nucleus, said process comprising contacting at least one of said alkene oxides with a catalyst comprising (a) an organoaluminum compound of the formula

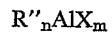

wherein R'' is a hydrocarbon radical selected from the group consisting of saturated aliphatic, saturated cycloaliphatic, and aromatic containing from 1 to 20 carbon atoms, inclusive; X is a member of the class consisting of hydrogen, fluorine, chlorine, bromine, and iodine; n is an integer of from 1 to 3, inclusive; m is an integer of from 0 to 2, inclusive; and the sum of the integers n and m equals 3; and (b) a metal salt of a beta-diketone of the formula

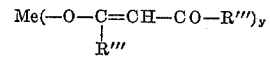

wherein Me is a metal selected from Groups II-A, III-A, IV-A, I-B, II-B, IV-B, V-B, VI-B, VII-B and VIII of the periodic table; each R''' is a radical selected from the group consisting of saturated aliphatic, saturated cycloaliphatic, and aromatic containing from 1 to 10 carbon atoms, inclusive; and y is an integer equal to the valence of the metal Me; said alkene oxide being contacted with said catalyst in the presence of an adjuvant selected from the group consisting of N,N,N'-N-tetraalkylbenzidines of the formula

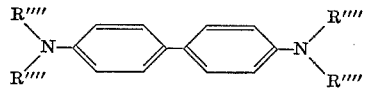

N,N,N',N'-tetraalkylureas of the formula

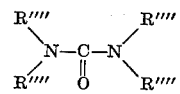

N,N,N',N',N'',N''-hexaalkylphosphoric triamides of the formula

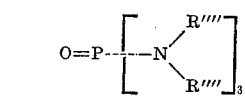

tris-N,N-dialkylaminomethylphosphines of the formula

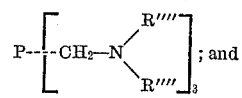; and tetrahydrothiophene 1,1-dioxides of the formula

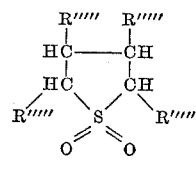

wherein each R'''' is an alkyl radical containing from 1 to 12 carbon atoms, inclusive; wherein each R''''' is a member of the class consisting of hydrogen and alkyl radicals containing from 1 to 12 carbon atoms, inclusive; and wherein the total number of carbon atoms in all of the R''''' alkyl radicals does not exceed 12; wherein said organoaluminum compound is present in an amount within the range of from about 1 to about 100 gram millimoles per 100 grams of monomer; wherein the mole ratio of said organoaluminum compound to said metal salt of a beta-diketone is within the range of from about 2:1 to about 100:1; and wherein said adjuvant is present in an amount within the range of from about 0.005 to about 5 grams per 100 grams of monomer.

9. A catalyst system comprising:
(a) an organoaluminum compound of the formula

wherein R'' is a hydrocarbon radical selected from the group consisting of saturated aliphatic, saturated cycloaliphatic, and aromatic containing from 1 to 20 carbon atoms, inclusive; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals 3;

(b) a metal salt of a beta-diketone of the formula

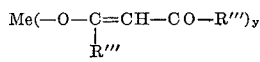

wherein Me is a metal selected from Groups II–A, III–A, IV–A, I–B, II–B, IV–B, V–B, VI–B, VII–B, and VIII of the periodic table; each R''' is a radical selected from the group consisting of saturated aliphatic, saturated cycloaliphatic, and aromatic containing from 1 to 10 carbon atoms; inclusive; and y is an integer equal to the valence of the metal Me; and (c) an adjuvant selected from the group consisting of N,N,N',N'-tetraalkylbenzidines of the formula

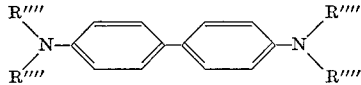

tris-N,N-dialkylaminomethylphosphines of the formula

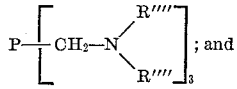

tetrahydrothiophene 1,1-dioxides of the formula

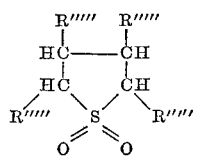

wherein each R'''' is an alkyl radical containing from 1 to 12 carbon atoms, inclusive; wherein each R''''' is a member of the class consisting of hydrogen and alkyl radicals containing from 1 to 12 carbon atoms, inclusive; and wherein the total number of carbon atoms in all of the R''''' alkyl radicals does not exceed 12; wherein said organoaluminum compound is present in an amount within the range of from about 1 to about 100 gram millimoles per 100 grams of monomer; wherein the mole ratio of said organoaluminum compound to said metal salt of the beta-diketone is within the range of from about 2:1 to about 100:1; and wherein said adjuvant is present in an amount within the range of from about 0.005 to about 5 grams per 100 grams of monomer.

10. A catalyst system consisting essentially of:
(a) an organoaluminum compound of the formula

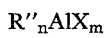

wherein R'' is a hydrocarbon radical selected form the group consisting of saturated aliphatic, saturated cycloaliphatic, and aromatic containing from 1 to 20 carbon atoms, inclusive; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals 3;

(b) a metal salt of a beta-diketone of the formula

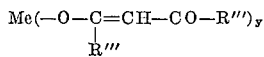

wherein Me is a metal selected from Groups II–A, III–A, IV–A, I–B, II–B, IV–B, V–B, VI–B, VII–B, and VIII of the periodic table; each R''' is a radical selected from the group consisting of saturated aliphatic, saturated cycloaliphatic, and aromatic containing from 1 to 10 carbon atoms, inclusive; and y is an integer equal to the valence of the metal Me; and (c) an adjuvant selected from the group consisting of N,N,N',N'-tetraalkylbenzidines of the formula

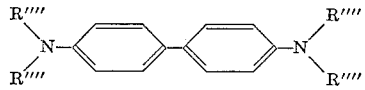

tris-N,N-dialkylaminomethylphosphines of the formula

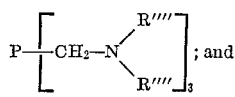

tetrahydrothiophene 1,1-dioxides of the formula

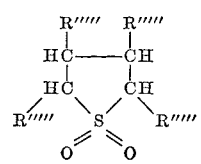

wherein each R'''' is an alkyl radical containing from 1 to 12 carbon atoms, inclusive; wherein each R''''' is a member of the class consisting of hydrogen and alkyl radicals containing from 1 to 12 carbon atoms, inclusive; and wherein the total number of carbon atoms in all of the R''''' alkyl radicals does not exceed 12; wherein said organoaluminum compound is present in an amount within the range of from about 1 to about 100 gram millimoles per 100 grams of monomer; wherein the mole ratio of said organoaluminum compound to said metal salt of a beta-diketone is within the range of from about 2:1 to about 100:1; and wherein said adjuvant is present in an amount within the range of from about 0.005 to about 5 grams per 100 grams of monomer.

11. The catalyst system of claim 10 wherein said adjuvant is N,N,N',N'-tetramethylbenzidine.

12. The catalyst system of claim 10 wherein said adjuvant is tetrahydrothiophene 1,1-dioxide.

13. The catalyst system of claim 10 wherein said adjuvant is tris(dimethylaminomethyl)phosphine.

References Cited

UNITED STATES PATENTS 3,147,240    9/1964    Coover et al. _____ 260—94.3
3,186,958    6/1965    Kutner et al.
3,259,590    7/1966    Weissernel et al.

OTHER REFERENCES

Metal Organic Compounds, Advances in Chemistry, Series 23, September 1959 (pp. 164–173).

J. of Polymer Science, vol. 47, issue 149 (1960) (pp. 486–488 relied on).

J. of Polymer Science, vol. 51, issue 156 (1961) (pp.) S7–S10 relied on).

WILLIAM H. SHORT, Primary Examiner

T. PERTILLA, Assistant Examiner

U.S. Cl. X.R.

252—431; 260—88.3

UNITED STATES PATENT OFFICE
CERTIFICATE OF CORRECTION

Patent No. 3,484,388            December 16, 1969

Clinton F. Wofford

It is certified that error appears in the above identified patent and that said Letters Patent are hereby corrected as shown below:

Column 9, the formula beginning at line 31 should appear as shown below:

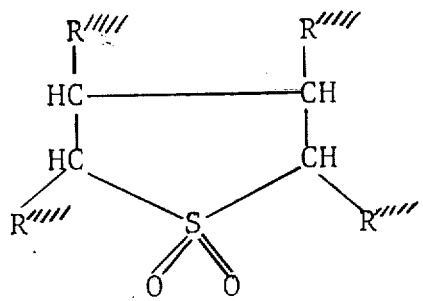

Column 10, line 3, "acrylic" should read -- acyclic --.

Signed and sealed this 9th day of June 1970.

(SEAL)
Attest:

EDWARD M. FLETCHER, JR.
Attesting Officer

WILLIAM E. SCHUYLER, JR
Commissioner of Patents